Figures 1, 2:
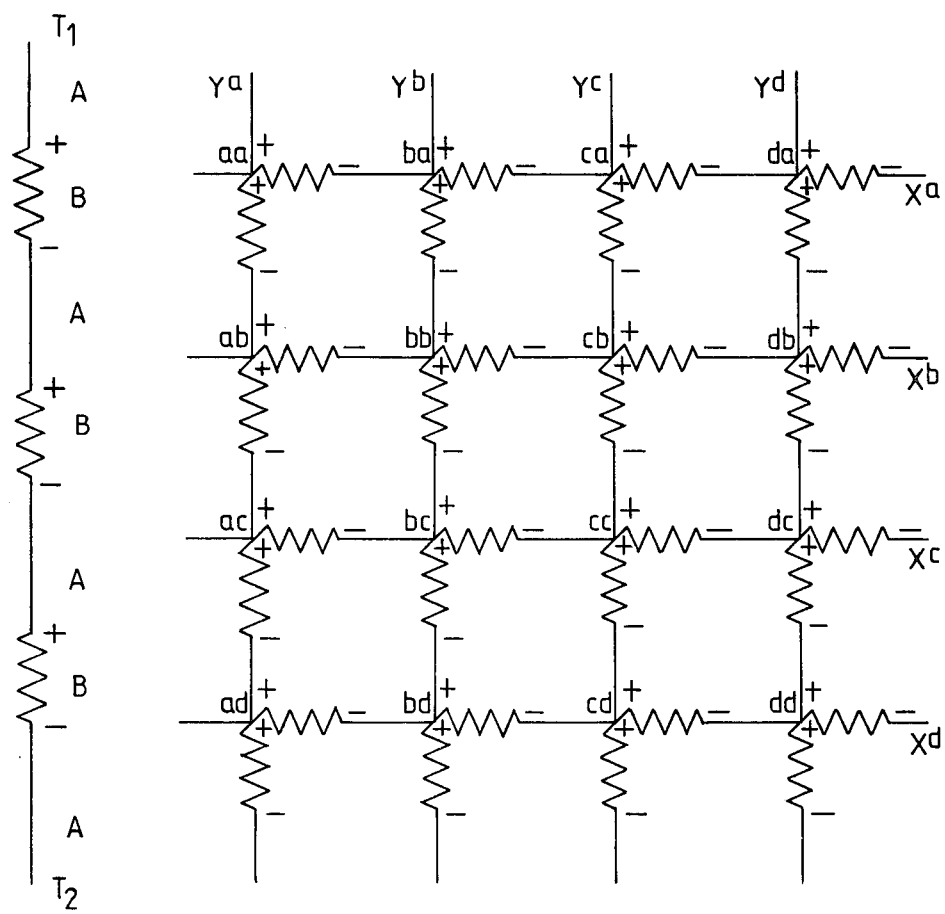

United States Patent [19]

Robinson et al.

[11] Patent Number: 4,488,269
[45] Date of Patent: Dec. 11, 1984

[54] TEMPERATURE SURVEILLANCE SYSTEMS

[75] Inventors: Cyril Robinson, Kuntsford; Alexander Thomson, Warrington, both of England

[73] Assignee: United Kingdom Atomic Energy Authority, London, England

[21] Appl. No.: 367,064

[22] Filed: Apr. 9, 1982

[30] Foreign Application Priority Data

Apr. 16, 1981 [GB] United Kingdom ............. 8112045

[51] Int. Cl.$^3$ .................. H01L 35/00; H01L 37/00
[52] U.S. Cl. ............................. 136/213; 136/225; 136/227; 374/179; 376/247
[58] Field of Search ............. 136/213, 225, 226, 227, 136/233; 374/111, 179; 376/247

[56] References Cited

U.S. PATENT DOCUMENTS

| | | | |
|---|---|---|---|
| 3,715,441 | 2/1973 | Collins | 136/233 X |
| 3,911,727 | 10/1975 | Katsuta et al. | 73/49.2 |
| 3,922,192 | 11/1975 | Duncombe et al. | 376/247 |
| 4,162,175 | 7/1979 | Sait et al. | 376/247 X |

FOREIGN PATENT DOCUMENTS

| | | | |
|---|---|---|---|
| 1303291 | 7/1962 | France | 376/247 |
| 2251935 | 6/1975 | France | 136/226 |

Primary Examiner—Leland A. Sebastian
Attorney, Agent, or Firm—William R. Hinds

[57] ABSTRACT

A lattice array of metal sheathed mineral insulated cables each cable having a coaxial conductor comprising alternate lengths of dissimilar thermo-electric material to provide thermo-electric junctions. The junctions are in two groups of opposite polarity and those of one group are disposed at the intersections of the cables while those of the other are disposed between intersections. Localized temperature increases create differentials between groups of sensors and can be located by the co-ordinates of the lattice array.

3 Claims, 4 Drawing Figures

TEMPERATURE SURVEILLANCE SYSTEMS

This invention relates to temperature surveillance systems for structures such as vessels.

In some structures which operate normally at a uniformly distributed constant temperature, it is desirable to have means for detecting a fault condition causing a localised change in temperature. A typical example of such a structure is a containment vessel for the reactor core of a nuclear reactor installation. A thermal barrier is provided between the reactor core and the vessel and it is desirable to be warned of a breakdown in the barrier. In a conventional temperature surveillance system regions of the structure which are susceptible to fault conditions which give rise to a localised temperature increase are each monitored by means of a discrete thermocouple hot junction. The junction can conveniently be formed at the end of a length of metal sheathed mineral insulated cable by welding ends of a pair of conductors together and closing the end of the sheath by capping. Difficulties arise in that such a system calls for a large number of cables which increases the possibility of a faulty signal and imposes the need for a large number of penetration glands in the vessel.

An object of the invention is to provide a temperature surveillance system which is robust and capable of monitoring as many points as a given system of the described conventional kind with a lesser number of cables.

According to the invention a temperature surveillance system comprises a plurality of metal sheathed mineral insulated cables in notional lattice array, each cable having a co-axial conductor comprising alternate lengths of dissimilar thermo-electric materials which provide thermo-electric junctions, alternately of opposite polarity, at their end abutments, the cables being arranged so that like junctions of one polarity occur at the intersections of the co-ordinates of the lattice array whilst the junctions of opposite polarity are disposed between the intersections of the co-ordinates. When the system is disposed over a structure such that the junctions at the intersections of the co-ordinates, hereinafter referred to as sensing junctions, are disposed at points of the structure susceptible to fault conditions whilst the remaining junctions, hereinafter referred to as reference junctions, are disposed at substantially isothermal points of the structure, a fault condition giving rise to increased temperature produces a detectable change in emf in the cables whereby the fault condition can be detected and located. Co-axial metal sheathed mineral insulated cables provide a surveillance system of greater integrity than the conventional system because for a given cross-sectional area of cable the insulant thicknesses can be reduced enabling the use of a more robust sheath of greater wall thickness and a conductor of larger cross section. The coaxial geometry substantially ensures that no undisclosed fault can exist.

Figure 3:
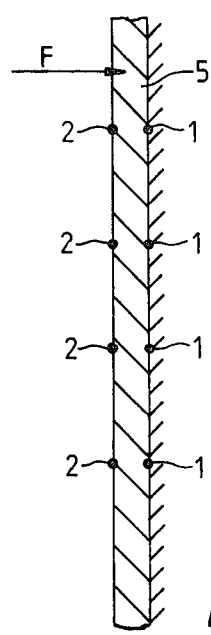
Figure 4:
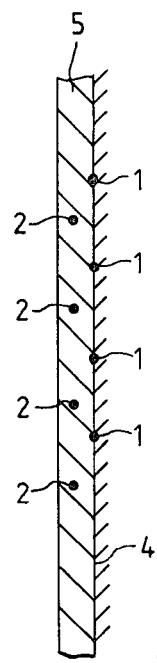

A temperature surveillance system embodying the invention is described, by way of example, with reference to the accompanying diagrammatic drawings wherein:

FIG. 1 shows the thermo-junction distribution in a metal sheathed mineral insulated cable for use in the system, FIG. 2 shows a lattice arrangement of cables of the kind shown in FIG. 1, and FIGS. 3 and 4 are sectional side views showing alternative structures.

In the drawing each plus (+) sign represents a junction of positive polarity and each negative (−) sign represents a junction of negative polarity.

The temperature surveillance system comprises a plurality of cables each comprising a single conductor disposed co-axially within a tubular metal sheath and insulated therefrom by powdered mineral insulation. Typically, the sheath may be of stainless steel and the insulation of magnesium oxide. The conductors each comprise alternate lengths of dissimilar thermo-electric material, for example Nickel-Chromium alloy and Nickel-Aluminium alloy designated A and B respectively in FIG. 1. The end abutments provide thermo-electric junctions, alternate junctions being of opposite polarity. With reference to FIG. 1, if the two terminal lengths of conductor designated $T_1$ and $T_2$ are of the same material and a complete cable is maintained isothermal between $T_1$ and $T_2$, then there will be no thermo-electric output but when any single junction region experiences a change of temperature, $\theta$, an emf $E\theta$ will be established between $T_1$ and $T_2$. $E\theta$ will be a function of the temperature change and the thermo-electric power of the materials A and B. The polarity of the emf will depend upon whether a positive or negative gradient junction is effected and whether the temperature increases or decreases. If "n" common polarity junctions experience the same change, $\theta$, the emf produced becomes $n.E.\theta$.

The arrangement shown in FIG. 2 comprises a plurality of the cables shown diagrammatically in FIG. 1 arranged in a notional lattice array the co-ordinates being designated X, Y with suffixes a, b, c and d. The cables are arranged so that like thermo-junctions of one polarity (designated +ve in FIG. 2) are stationed at the intersections of the co-ordinates of the lattice array whilst the junctions designated −ve polarity are disposed between the intersections of the co-ordinates.

In use, the temperature surveillance system is attached to a structure such that the junctions of positive polarity are disposed at regions of the structure susceptible to fault conditions which can cause a temperature change whilst the negative junctions are disposed at regions which are maintained at a temperature which is average for the structure. In the event of a fault condition, the change in temperature gives rise to a representative thermo-electric signal which gives an indication of the existence of a thermal fault.

The principle is valid for multiple faults since only cables having junctions coincident with a faulty station will carry a signal. Two examples of a double fault condition are described with reference to FIG. 2. If there are faults at stations bb and bc, signals will be observed on cables Xb, Xc and Yb. If there are faults at stations bb and bd signals will be observed on cables Xb, Xd and Yb. In both cases the Yb signal will be twice the representative amplitude ($2E\theta$) confirming that it is responding to two fault stations.

The described system represents an ideal lattice arrangement but in a practical application the reference junctions can be thermally coupled to any constant temperature position which is independent of the fault phenomena and the standing potential existing on each cable will have to be disregarded when interrogating the system for fault signals.

In an alternative application shown in FIG. 3, the adjacent sensing and reference junctions designated 1 and 2 are placed either side of a thermal barrier element 5 which is itself attached to the structure 4 at the critical location. This will produce a change in thermal emf when, for example, loss of insulation causes an increase in the heat flow designated F across the thermal barrier. The thermal barrier element may be, for example, gas pocket defining sheets of stainless steel or ceramic bricks.

In a further alternative application shown in FIG. 4 the reference thermal junctions 2 are enclosed in a mass 5 of material of low thermal diffusivity and then attached to the same part of the structure 4 as the sensing junctions 1. Any fault which causes a change in the output of the sensing junction will be delayed in its influence on the reference junction for a period of time which may be several minutes. During this time delay, an interrogation system will be able to identify a faulty station. The material of low thermal diffusivity may be, for example, a glass fibre mat.

The main advantage of the described temperature surveillance system is that fewer cables are required than in a system where a single conventional thermocouple is placed at each station. A cable lattice with a 10×10 distribution, for example, will monitor 100 stations at the cost of only 20 cables. Further advantages reside in the facts that co-axial thermocouples being of high integrity reduce the risk of spurious faults, particularly since undisclosed faults cannot be sustained by a co-axial thermocouple and replacement of a faulty cable due, for example, to conductor or insulation faults can be effected by using the original cable as a draw-wire to insert a replacement.

We claim:

1. A temperature surveillance system for a structure having regions which are susceptible to fault conditions which can cause temperature changes, comprising a plurality of metal sheathed mineral insulated cables in notional lattice array, each cable having a co-axial conductor comprising alternate lengths of dissimilar thermo-electric materials for providing thermo-electric junctions at end abutments of said alternate lengths, alternate junctions being of opposite thermo-electric emf polarities in the sense that opposite emf polarities will be developed at alternate junctions if exposed individually to the same temperature conditions, the cables being arranged so that like junctions of one thermo-electric emf polarity occur at the intersections of the co-ordinates of the lattice array whilst the junctions of opposite thermo-electric emf polarity are disposed between the intersections of the co-ordinates, said junctions of said one thermo-electric emf polarity at said intersections comprising sensing junctions disposed at regions of the structure which are susceptible to fault conditions which can cause a temperature change, and said junctions of opposite thermo-electric emf polarity being located at substantially isothermal regions.

2. A temperature surveillance system according to claim 1, a structure for supporting the system, and a thermal barrier element cladding one side of the structure, the system arranged so that the junctions of one polarity are disposed on one side of the element adjacent the structure whilst the junctions of the other polarity are disposed on the other side of the element.

3. A temperature surveillance system according to claim 1, a structure for supporting the system, and a mass of material of low thermal diffusivity disposed adjacent the structure, the system arranged so that the junctions of one polarity are disposed within the mass whilst the junctions of the other polarity are disposed adjacent the structure.

* * * * *